Oct. 12, 1965  G. E. LAUTERBACH  3,211,564
CONTINUOUS HIGH TEMPERATURE PROCESS FOR OXIDIZED
STARCH FOR COATING COMPOSITIONS
Filed June 13, 1961  6 Sheets-Sheet 1

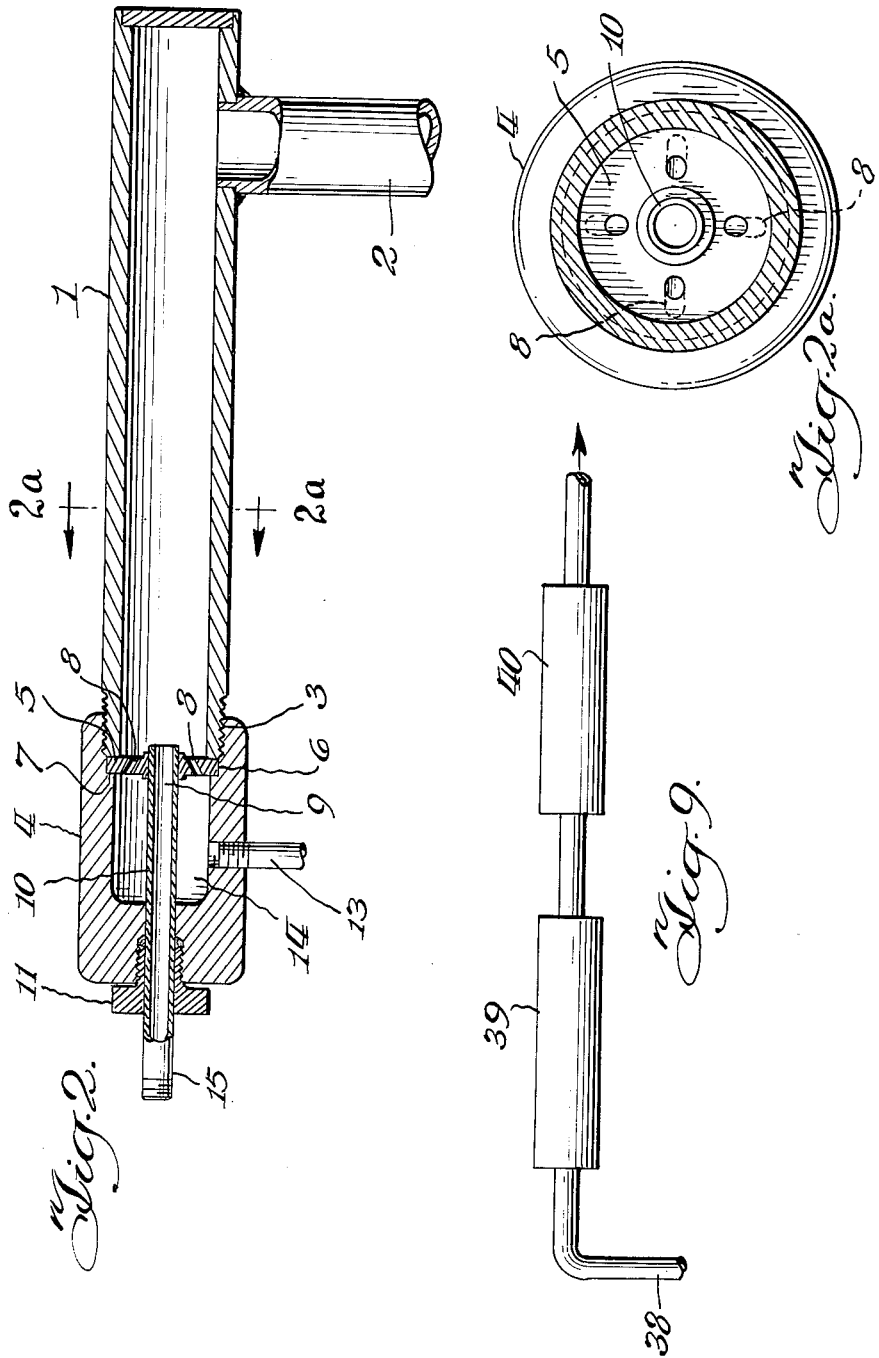

PICK RESISTANCE AS A FUNCTION OF STARCH MODIFICATION

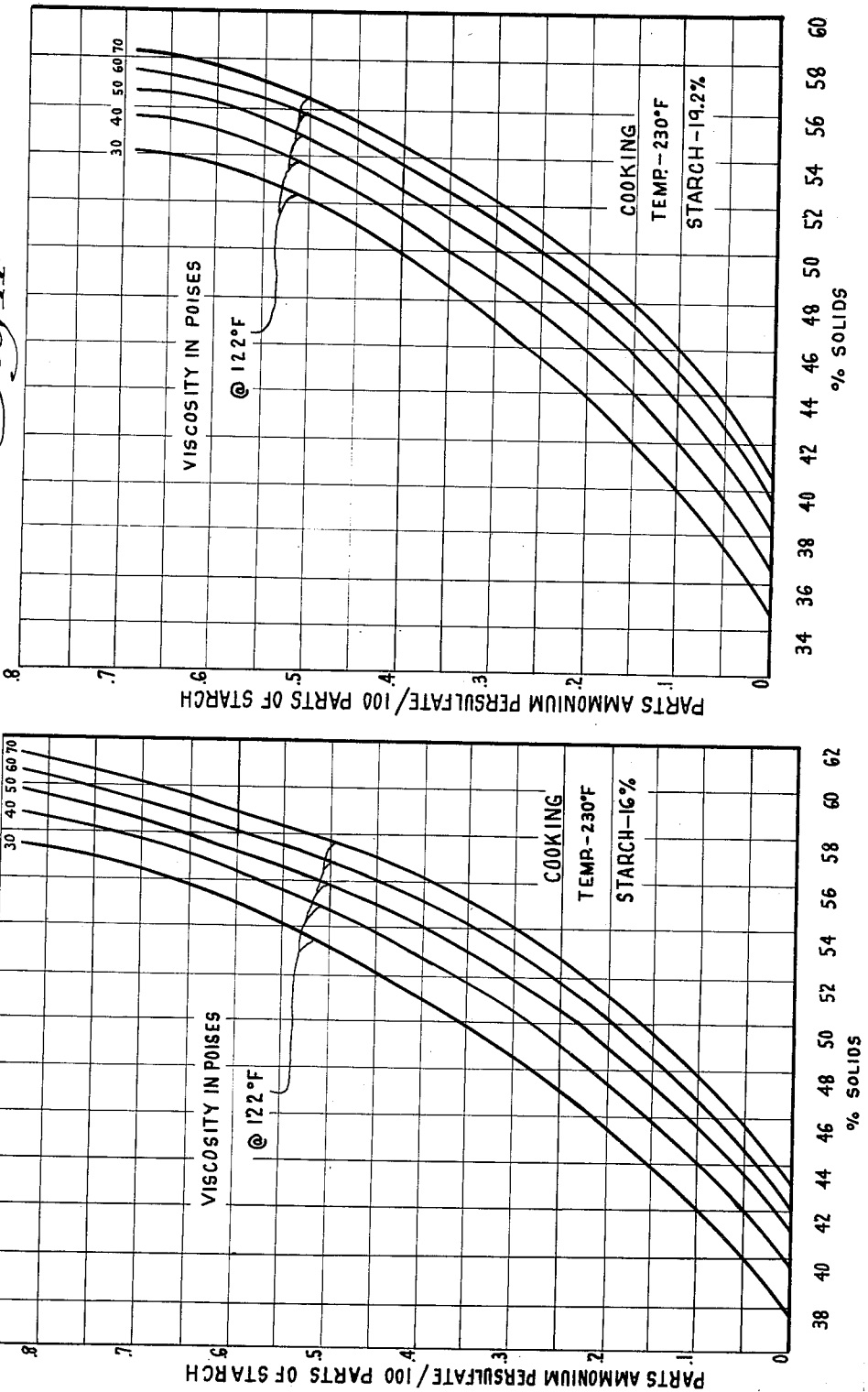

United States Patent Office 3,211,564
Patented Oct. 12, 1965

3,211,564
CONTINUOUS HIGH TEMPERATURE PROCESS FOR OXIDIZED STARCH FOR COATING COMPOSITIONS
George E. Lauterbach, Neenah, Wis., assignor to Kimberly-Clark Corporation, Neenah, Wis., a corporation of Delaware
Filed June 13, 1961, Ser. No. 116,734
8 Claims. (Cl. 106—214)

This invention relates to coating compositions for paper and the like and, more specifically, is directed to the production on a continuous controlled basis of pigment-starch adhesive formulations and particularly to formulations wherein the starch adhesive is simultaneously cooked and oxidized in the presence of the pigment and the composition is provided at desired viscosity-solids relationships.

Coating formulations for webs such as paper commonly comprise a pigment and an adhesive; the adhesive serves the purpose of binding pigment to the web and of bonding pigment particles together. The starch employed as such adhesive is usually modified by any one of several processes such as dextrinization, acid hydrolysis, enzyme modification or oxidation by hypochlorites. The purpose of such modification is to permit the provision of a paste of regulated viscosity for the coating formulation when the starch is cooked.

Native starches exhibit, when cooked, a thickness or viscosity which is generally too great for mineral coating compositions such as are employed in the treatment of paper. Reduction of viscosity of unmodified or native starches by the addition of water reduces the starch concentration to such an extent that the adhesive value of the starch is impaired; further, water dispersions of native cooked starch are sensitive to changes in hydration, occasioning considerable viscosity change and, accordingly, such starches are difficult to control in coating compositions.

The effect of starch modification is to alter to some extent the molecular nature of the starch and to permit the control and reduction of starch viscosity. Since, however, reduction of viscosity is accompanied by a decrease in adhesive strength, such modification and control must be carefully exercised in coating composition formulations.

Reduction of viscosity of the starch is of importance also in connection with the solids percentage of the coating composition. As viscosity of the starch is decreased, a higher percentage of solids may be employed; higher solids in the coating composition provides for greater weight pickup by the web undergoing coating treatment and is therefore very desirable. In addition, in coating operations as, for example, on the papermaking machine itself, high solids and relatively low water content provide that less water must be evaporated to dry the web and, therefore, with a given installation, higher operating speeds may be achieved.

Furthermore, the type of coated paper being produced imposes restrictions upon the solids concentration of the coating composition which composition must still be within a usable viscosity range for the specific manufacturing conditions. The weight of the dried coating film is one characteristic of the paper type; control of this weight is important to the overall quality control of the paper product. Since the weight of the dried coating is directly related to the concentration or percent solids of the coating composition, and the viscosity requirements of the specific process are also restricted by further considerations of finished paper quality, it is usually best to operate a coating device with coating compositions of constant viscosity and to vary the percent solids according to the desired dried coating weight. In practice, the foregoing is generally achieved by varying the degree to which the native starch viscosity is modified.

Viscosities of coating compositions usually vary with the nature of the coating device and, for specific purposes, may be varied over a wide range. The practice of the invention described hereinafter facilitates accurate viscosity control.

In the customary preparation of coating compositions for paper webs and the like, commercially modified starches (oxidized) or starches modified at the paper mill by an enzyme method are employed. Thus, frequently the starch as received at the paper mill is already modified and adapted to be made into a slurry; such starch, when oxidized by the usual chemical, for example, hypochlorite oxidation method, is subject to the loss in preparation of 5 to 10% of solubles by weight. Further, due to its pre-treatment, such commercially modified starch commands a premium price relative to raw or native starch. Accordingly, the oxidized starch of commerce which must be slurried and cooked at the mill to the desired viscosity lacks some of the components of the original starch and is expensive. Such starch is usually slurried and cooked separately from the pigment suspension and then mixed with the pigment suspension to form the coating composition, the cost of the coating formulation being therefore relatively high and, in addition, time consuming. Further, in mill operation, this procedure is relatively inflexible. Should it become necessary in the course of a coating operation to adjust coating composition characteristics as to viscosity or solids, one factor cannot be changed directly without adversely affecting the other. Also, in successive runs on a papermaking machine or on a coating machine, it is frequently required that a succeeding coating operation will be of different grade or weight, and the whole coating base must usually be changed to accommodate the new situation. In many instances several commercial modified starches of differing degrees of modification must be stocked and blended when mixing in order to secure appropriate solids-viscosity relationships in the coating formulation.

Enzyme modified starches prepared at the mill in general require roughly several percent more binder based on the clay than the usual commercial modified starch; in addition, the quality of the finished coated paper tends to be inferior, with respect to coated paper prepared from commercially modified starches.

One object of the present invention is to provide a process for continuously forming a coating composition having cooked oxidized starch as a constituent and in which method starch oxidation and cooking are effected in the presence of other ingredients of the coating composition.

Another object of the present invention is to provide a new and improved method of formulation of mineral coating compositions utilizing native starch or suitable starch derivatives as one initial component, and which composition is readily subject to viscosity and solids percentage control.

An important object of the present invention is to provide improvements in coated paper, particularly as to pick resistance.

The practice of a preferred embodiment of the present invention involves the formation of a starch-pigment suspension together with any other desired components, and the subjection of the suspension or slurry to temperatures well above the gelatinization range of the starch in the presence of an oxidizing agent for a short period of time. The suspension is vigorously agitated and continuously moved through a temperature zone to effect formulation of the coating composition on a continuous basis. In essence, it has been found that coordination of the factors of heat, agitation applied to the feeding slurry, and regulation of the concentration of the oxidizing agent relative to the starch, provide for the attainment of compositions having very suitable solids-viscosity relationships for coating applications. Cooling from the reaction temperature to a temperature desired for application to a coating device may be effected, preferably under agitation.

The thus generally described procedure permits the attainment of several important features. Specifically, the degree of starch modification and, consequently, starch viscosity, may be controlled simply by control of the quantity of the selected oxidizing agent; the oxidizing agent itself is completely consumed in the procedure providing its own reaction termination point; the quantity of oxidizing agent required is so small as to be negligible with relation to the total solids of the composition and, accordingly, the viscosity control is effected independently of the total solids; further, total solids may be varied and the viscosity adjusted such that it may be maintained constant or varied within limits as desired at the new solids concentration; the coating composition flow may be to a convenient receiving zone, that is, directly to the coating device or to an intermediate storage of relatively small capacity, thus simplifying equipment and space problems; native starch such as pearl starch is suitably employed, thus achieving a saving in cost and making full use of the starch itself; the coating resulting from the procedure has improved characteristics for coating machine operation relative to coatings produced in an identical manner but without starch modification, the improvements being particularly found in the lay of the composition on coater rolls and the ease of finishing of the coated paper; the coated product itself in the case of printing paper, for example, provides improved qualities particularly as to pick resistance.

The procedure of invention is readily subject to automatic control, as will be noted more fully hereinafter.

Important to the procedure is that the starch be thoroughly and uniformly exposed to the oxidizing agent. Vigorous agitation, preferably at temperatures well above the gelatinization range of the starch, serves this purpose. Relatively high temperature of the aqueous slurry accompanied by the agitation apparently provides for rapid swelling of the feeding starch granules followed by granule rupture and permeation of the rupturing granular material by the oxidizing agent.

In practice, temperatures of 220° F.–350° F. have been found most useful in effecting control; these temperatures are well above the gelatinization range of starches used in coating compositions; most starches have a gelatinization range above 120° F. and below 175° F.

Apparatus for the continuous cooking of starches under pressure are known and suitable for the practice of the invention. These include cookers of the type which inject live steam directly into the slurry as well as those which use indirect heating and incorporate a mechanical scraper for coat removal in film form from heat transfer surfaces. A specific apparatus useful for the purpose is disclosed hereinafter. Essentially, any cooker in which the pigment-starch slurry may be subjected to high temperature under pressure while shearing action of a liquid or mechanical nature is exerted on the slurry may be employed. In the types of equipment in which the slurry is exposed directly to the steam, some condensation occurs but is a constant factor and is compensated for in the initial slurry make-up.

The raw starch itself may be derived from corn, sorghum, potatoes, wheat, rice, tapioca and the like, although pearl cornstarch is readily available at reasonable cost and preferably employed. Starch derivatives such as the ethers, esters, mercaptans and other sulfur derivatives, nitrogen derivatives, and, in general, starches capable of being modified as to viscosity and which must be modified to be useable in coatings, are operable in the practice of the invention. The physical form of the starch is suitably pearl, although powder or any finer divided form may be utilized. Suitably, the raw starch for operation on a continuous basis is slurried separately from the other components, and the slurries are metered together for mixing.

The pigments also are conventional; clay, calcium carbonate, titanium dioxide, and the like being utilized. Suitably, the pigment or pigment combinations are slurried in aqueous alkaline solution, and with a dispersant such as soluble phosphate.

Additives for specific purposes such as soap or dyes may be incorporated with the mixed slurries of pigment-starch. Dyes such as Rhodamine B and Paper Blue R perform well. Soap or other similar additives, if desired, may also be incorporated with the completed cooked slurry just before the same is passed to the coating machine.

The oxidizing agent in the preferred embodiment of the invention is selected to be dispersable in an aqueous, alkaline pigment-starch slurry, and for this purpose should preferably be soluble in water to a considerable degree. Suitable oxidizing agents include the hypochlorites, persulfates, peroxides, permanganates, perborates, and others. Suitably, such agent should have a high oxidizing potential and, over a repeated series of tests, ammonium persulfate has been found thoroughly reliable and to provide completely reproducible results. The addition of such ozidizing agent may be effected in a number of ways, but generally it is simply introduced in aqueous solution and well mixed with the other components of the slurry.

The quantity of oxidizing agent employed is small, such as to have an insignificant effect on total solids, and is dependent upon the extent to which modification of the starch is desired for the particular coating composition solids.

The alkali provided should be sufficient to neutralize the reaction products and provide the ultimate coating composition at a pH greater than about 7; such pH provides for more effective control of the ultimate solids-viscosity relationships in the coating composition. Sodium hydroxide, sodium bicarbonate, and sodium carbonate are effective for the purpose and vary somewhat in amount with the quantity of oxidizing agent employed. The latter agent is itself required only in very small quantities, usually from about 0.1% to less than 1% of the weight of the starch and, accordingly, the total solids contributed by the combination of alkali and oxidizing agent is so small relative to the total solids (usually 50–70% by weight) of the coating composition that their solids effect may be ignored. It should be noted that the starch is commonly present in such coating compositions to the extent of about 15–22 parts per 100 by weight of the pigment and, in some special instances, may be present on a 50–50 basis with the pigment. Even under the latter circumstance, the oxidizing agent and the neutralizing agent are present in very minor proportion and may be ignored in discussion of control of total solids.

In the preferred practice of the invention the alkali may be increased as the persulfate or other oxidizing agent level is increased in order to maintain the coating color alkaline. As the oxidation is increased, the percentage of solids the composition may accommodate increases. Thus, at a cooking temperature of about 260° F. and a percentage of ammonium persulfate of 0.33 based on the starch weight as 100, the percentage of coating solids is about 52. By merely increasing the percentage of oxidizing agent to 0.83 while maintaining the same cooking temperature, the solids are increased to approximately 59% with the same percentage of starch employed and at the same viscosity. Thus, a considerable solids gain is achieved with a very minor addition of oxidizing agent—a gain which is reflected in coat weight of the paper to which the composition is applied.

The oxidation of starch at cooking temperatures with ammonium persulfate tends to produce a brown color in the coating composition product. It is known that this color formation may be avoided if a small amount of hydrogen peroxide is incorporated with the ammonium persulfate initially. Such an amount of hydrogen peroxide is so small as to be insignificant to the total oxidative effect, the percentage of hydrogen peroxide usually amounting to about 3% or less of the ammonium persulfate itself, which, as already noted, is present in very minor proportion. However, the hydrogen peroxide tends to inhibit the oxidation reaction and to occasion a residual viscosity change after the coating composition has emanated from the reaction apparatus described hereinafter. This residual viscosity change may also be present in the absence of hydrogen peroxide when perborate is the oxidant or when an exceedingly short cooking time of about less than ½ a minute and the lower ranges of temperatures are employed.

Normally, the oxidation reaction is nearly completed as the coating composition leaves the apparatus. However, when hydrogen peroxide is employed and when the viscosity of a sample of the issuing coating composition is examined with a continuously recording viscosimeter, a viscosity decrease with time is observed. Such residual viscosity change is dependent upon time and temperature and is completed to within 10% of the ultimate viscosity in 10 minutes at 203° F., in 13 minutes at 185° F., and in about 32 minutes at 167° F. when the cooking temperature is 230° F., and when the starch percentage based on the pigment is 15% and the concentration of ammonium persulfate is 0.67% based on the starch. Accordingly, if cooling is delayed for approximately 10 minutes after the coating is ejected from the heating chamber and the temperature of the coating composition is maintained above 203° F., the residual reaction presents no control problem. It is to be noted that by increasing the reaction temperature, for example, to 260° F., the residual reaction time is reduced to about seven minutes, and at 305° F. it is less than ½ minute when the composition issuing from the reaction chamber is maintained at least at 203° F.

The hydrogen peroxide, the effect of which is to increase the residual reaction time, need not be employed if the coating composition is utilized within a short time, that is, a matter of hours, of its ejection from the reaction chamber as no brownish color then develops in the product. The elimination of the hydrogen peroxide not only reduces the residual reaction time but facilitates automation of the equipment by permitting the introduction of a viscosity measuring device close to the reaction chamber, thus aiding control of the viscosity modification reaction totally independently of production rate.

The residual viscosity change, that is, the viscosity change upon leaving the reaction chamber, may be substantially eliminated by introducing into the initial slurry metallic ions such as cupric ions in a very slight amount based on the starch. Too small a concentration of the metallic ions does not occasion complete elimination of the residual viscosity change; too large a concentration simply is a waste of material. Generally, copper sulfate may be present to the same extent by weight as ammonium persulfate oxidizing agent; incorporation to the extent of ½% by weight of copper sulfate based on the starch eliminates the residual reaction time when the oxidation and cooking temperature is at least 230° F.; and this action is substantially independent of starch and oxidant concentration. This is in contrast to a residual reaction time of about four minutes when no hydrogen peroxide and no cupric ions are employed.

A further advantage of the incorporation of metallic ions such as cupric ions is that, under the alkaline conditions required in the usual coating composition, the metallic ions aid the function of color stabilization and thus serve as a replacement for hydrogen peroxide. Accordingly, the introduction of cupric ions, for example, permits a longer dwell time between the reaction vessel and the ultimate use of the coating composition without possibility of deleterious color formation. Additionally, the cupric ions apparently serve to some extent as a starch preservative and may therefore be introduced to a premixed starch slurry and stored prior to combination with the oxidizing agent.

There is an apparent upper limit to the extent which percent solids may be increased at a given starch percentage while providing suitable pick resistance. At about 62% of solids, at 15 parts of starch per 100 parts of clay, the letterpress pick resistance decreased sharply, although over a range from 42% solids to 62%, the pick resistance had remained substantially constant. Pick resistance at higher solids than 62% may, however, be retained by formulation.

Coat weight on the paper is a function of total solids and increases materially with reaction temperature and with percent of oxidizing agent in the initial slurry; total solids may be controlled by these latter factors. For example, at a cooking temperature of 300° F. and an ammonium persulfate percentage of 0.83 based on the starch as 100, the percentage of solids achieved was about 60.7. By merely increasing the cooking temperature to 335° F., with the other factors being held constant, the solids attained increased to 64.2%. Similarly, at 300° F. with persulfate percentage of only 0.33, the solids decreased to 55%, while, at 335° and 0.33%, the solids were 60.1%. Thus, by varying either the temperature or the percentage of oxidizing agent, solids may be controlled within useful coating composition ranges.

The invention will be more fully understod by reference to the following detailed descriptions and accompanying drawings wherein:

FIGS. 2 and 2a are respectively a longitudinal sectional view and an end view illustrating one form of heating apparatus and reaction device suitable for the practice of the invention.

FIG. 9 is a schematic illustration of another arrangement of equipment in accordance with the invention.

FIG. 10 is a graph of the percentage of solids vs. the oxidizing agent percentage at varying viscosities and a constant percentage of starch modified in the presence of metallic ions and calcium carbonate as a portion of the pigment.

FIG. 11 is a graph similar to that of FIG. 10 but at an increased percentage of starch.

Figure 1:
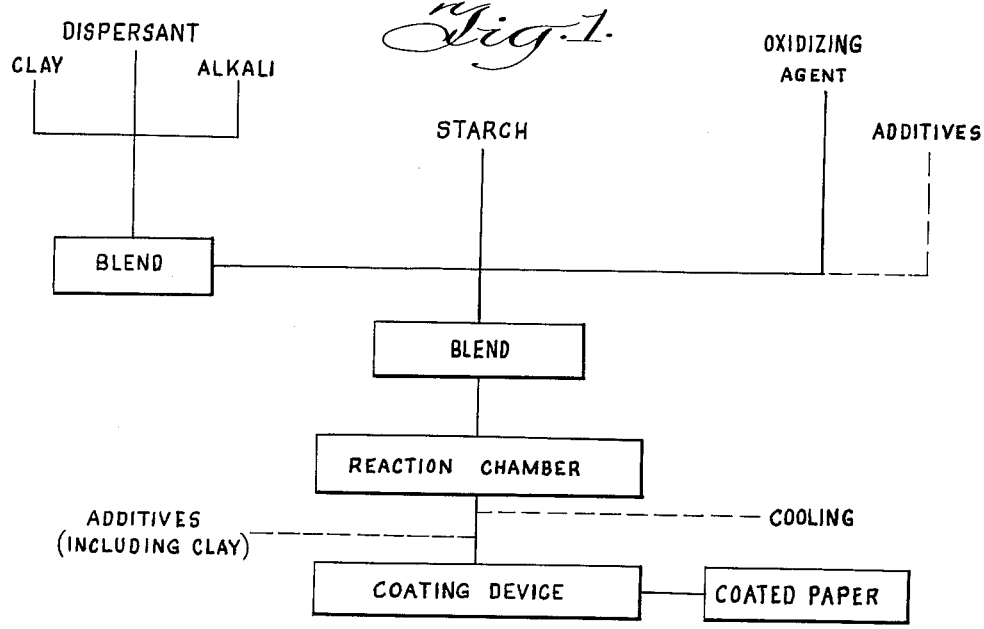
FIG. 1 is a flow chart illustrating a preferred embodiment of the method of invention.
Figure 4:
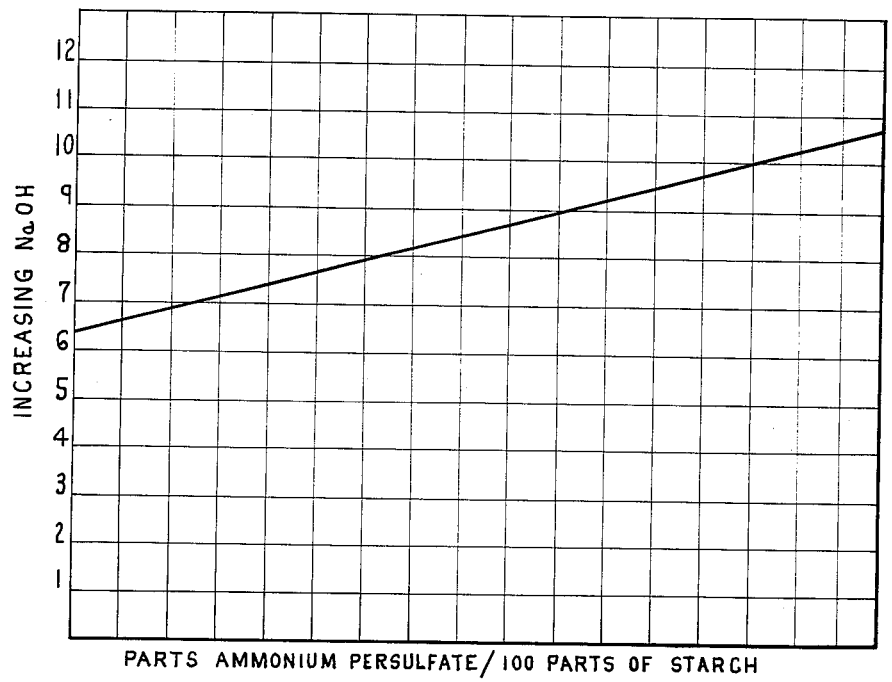
FIG. 4 is a graph illustrating the relationship of alkaline and oxidizing agent addition for a particular and preferred embodiment of the invention.

Referring to the drawings and initially particularly FIG. 2, the numeral 1 designates a longitudinally extending mixing chamber having an outlet 2 at its rightward end. This chamber is of stainless steel and in the specific embodiment illustrated has a length of about 11¾ inches overall and a diameter of about 1½ inches. At its leftward extremity 3 the mixing chamber is threadedly received in a holder 4 suitably of brass or bronze and having an overall length of about 4⅛ inches. Holder 4 is adapted to retain an orifice plate 5 which, as shown in FIG. 2, is supported in a cavity 6 of the holder in abutment with an internal peripheral shoulder 7 of the holder.

Orifice plate 5 is provided with a plurality of peripherally disposed orifices 8 which angle downwardly rightwardly (FIG. 2) and open toward the longitudinal axis of the mixing chamber 1. Orifice plate 5 is itself supported at one extremity 9 of a longitudinally axially extending support 10 in the form of a stainless steel pipe of about ⅛ inch diameter and about 5½ inches in overall length. At its rightward extremity 9 the conduit 10 opens axially into the mixing chamber 1.

Leftwardly (FIG. 2) the holder 4 receives threadedly adapter 11 which is axially bored at 12; conduit 10 extends leftwardly through the adapter.

The holder 4 is provided with a steam inlet 13 through the wall thereof and which inlet communicates with the steam chamber 14. Thus, communication is established for the flow of steam through the inlet 13, steam chamber 14, and orifices 8 to the mixing chamber 1. As may be noted from FIG. 2a in the specific embodiment illustrated, the orifices 8 are disposed at substantially 90° apart around the orifice plate 5.

Figure 3:
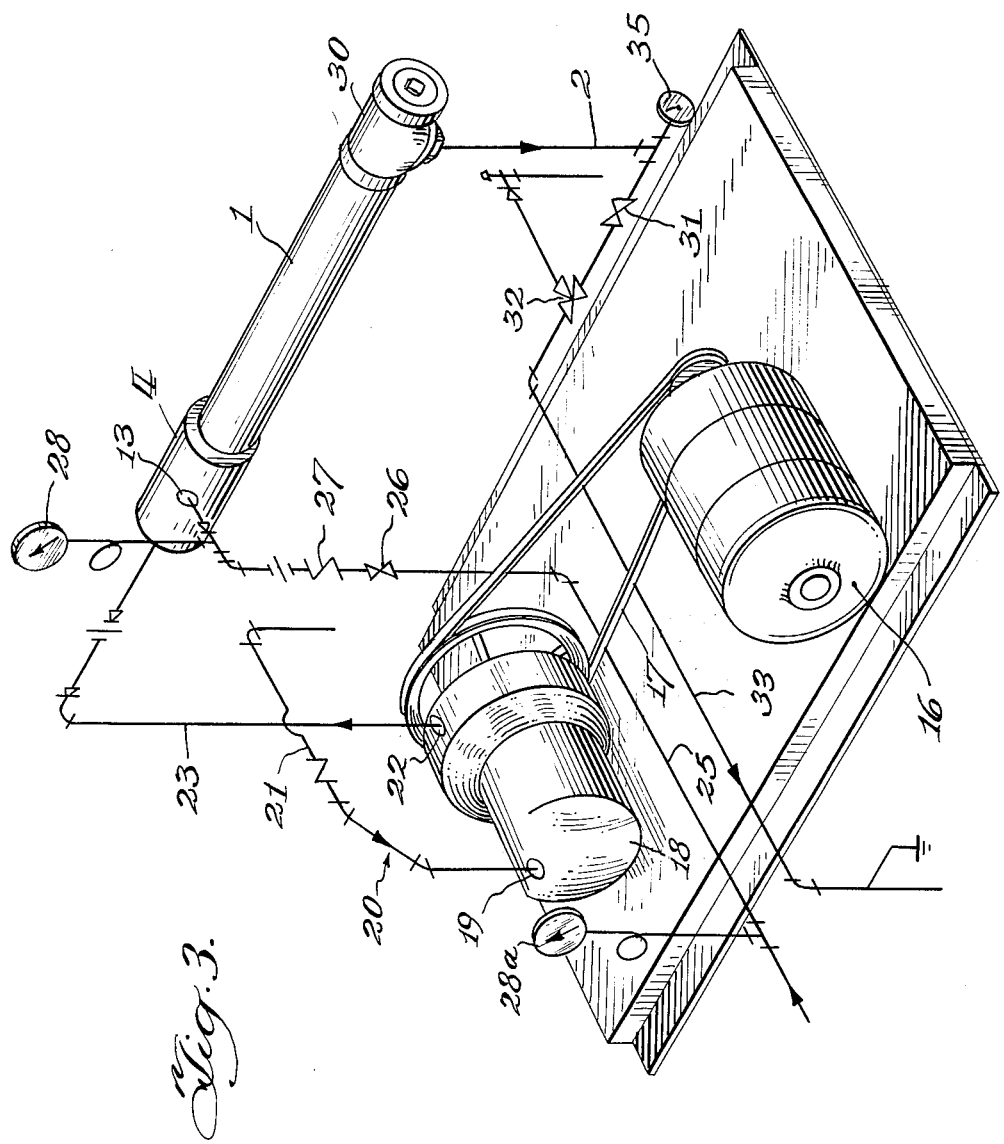
FIG. 3 is a schematic view of an apparatus arrangement useful in connection with the device of FIG. 2.

As illustrated in FIG. 3 the mixing chamber 1, together with its associated holder 4, are suitably and simply connected into a system for the feeding of a slurry and steam to the mixing chamber. More specifically as illustrated in FIG. 3, electric motor 16 is connected through a suitable belt-drive 17 to a pump 18. Pump 18 has an inlet 19 and piping generally indicated at 20 including a check valve 21 through which the coating composition slurry is fed to the inlet 19 from any suitable source. Outlet 22 of the pump is connected through suitable piping 23 to the leftward extremity 15 (FIG. 2) of the conduit 10.

Steam is fed to the steam inlet 13 from a suitable source through steam line 25 including globe valve 26 and check valve 27. This line is equipped with a 0–160 pounds per square inch pressure gauge 28.

As illustrated in FIG. 3 in application, the rightward end of the mixing chamber 1 is provided with a T connection 30 which incorporates the outlet line 2 of the mixing chamber. The outlet line is suitably of a ½ inch stainless steel and includes a two-way valve 31, a three-way valve 32 and suitable piping 33 for flow of material to the coating device (FIG. 1) or to a storage tank or the like. The three-way valve 32 provides for by-passing of the converted cooked slurry when so desired. A dial thermometer is provided at 35 on the outlet line and the cooking temperatures noted throughout the specification are measured at the outlet.

In operation the pump 18 is suitably driven at a speed to provide a flow of about ½ gallon per minute in the mixing chamber 1. Steam flow is controlled by means of the globe valve 26 to provide desired operating temperatures. Further, by appropriate control of the valve 31, a back pressure may be developed in the mixing chamber 1 when so desired. The steam issuing from the orifices thoroughly agitates and shears the slurry moving axially through the heating zone of the mixing chamber.

The following specific examples illustrate the novel process in greater detail. Such process is preferably carried out in accordance with the steps illustrated in FIG. 1—certain of the steps such as positive cooling and the inclusion of additives being dependent upon the specific requirements of the coating device to which the procedure is directed.

EXAMPLE 1

Initially a series of coating formulations were prepared which form the basis of the data set forth in the graphs of FIGS. 4–8 inclusive. An exemplary slurry which was modified as noted hereinafter contained the following parts by weight in grams:

| | Parts by weight |
|---|---|
| Clay | 2000 |
| Sodium hexametaphosphate (50% aqueous solution) | 12 |
| Sodium hydroxide (50% aqueous solution) | 8 |
| Pearl cornstarch (dry basis) | 300 |
| Soap | 20 |
| Ammonium persulfate (0.33% on starch) | 1 |
| Hydrogen peroxide (3% solution) | 1 |
| Water | 1400 |

This a relatively thin slurry and is readily pumped.

The slurry was pumped to the continuous reaction vessel illustrated in FIG. 2 at a flow rate of ½ gallon per minute such that the time of passage through the mixing chamber was about 1½ to 2 minutes. This coating gave at 50° C. a reading of 43° Brookfield (43 poises) at 56% solids. The temperature of cooking was 235° F. In the cooking and oxidizing action the slurry increased in viscosity materially.

As will be noted, the percent of solids from the initial slurry dropped approximately 6 percentile due to dilution by the steam condensate. A dilution of 4–6 points commonly accompanies the use of the apparatus described in connection with FIG. 2. Since, however, this is a constant factor, compensation for it is readily made. Under the specific conditions noted above, the coating composition issuing from the cooker at 235° F. is flashed to the atmosphere and the temperature dropped to about 208–210°; this of itself was insufficient to cause any material effect on total solids.

In the preparation of each slurry (Table 1 below) 2000 grams of dry coating clay were added to an aqueous solution containing the 12 parts of hexametaphosphate dispersing agent and alkali.

The quantity of alkali in the complete formulations varied (FIG. 4) with the percentage of the ammonium persulfate oxidizing agent employed but was sufficient to neutralize the reaction products formed.

The quantity of tap water employed was also varied between 1000 and 2000 cc. at the various formulations to provide appropriate solids concentrations.

After the addition of the clay, 300 grams (bone dry basis) of pearl starch, a so-called native, raw unmodified and uncooked starch, was stirred into the slurry. Thereafter, 20 grams of the soap were added. During the component additions, the slurry was agitated with a turbine propeller to provide good dispersion of the components. The ammonium persulfate, hydrogen peroxide (3% solution) and a small amount of alkali were made up as an aqueous solution for convenience and added to the slurry in this form.

Coatings were prepared utilizing 0.17, 0.33, and 0.50% ammonium sulfate based on the starch as 100%. It should be noted that all coatings had the same level of adhesive, that is, approximately 15% binder based on the clay. The water content of the initial slurry, as noted above, was adjusted to provide the appropriate solids. The cooked coating compositions were each then roll coated onto a 50-pound paper base sheet and were found to provide superior pick resistance as compared to a commercially modified starch cooked under the same conditions but without the ammonium persulfate. Table 1 sets forth the data obtained from the foregoing tests utilizing a reaction temperature in the chamber 1 of about 235–240° F., followed by roll coating and supercalendering on a laboratory supercalender. Roll coating is a most sensitive method of coating with respect in particular to viscosity and rheological properties.

*Table 1.—Roll coated 50# paper basis weight*
*(25 x 38—500)*

| 15% Binder | S₂O₈, percent | Rotary [1] Rupture | Pick | Letterpress Pick |
|---|---|---|---|---|
| Pearl cornstarch | 0.17 | 21.0 | 17.8 | 1.0 |
| Do | 0.33 | 20.8 | 11.6 | 1.0 |
| Do | 0.50 | 20.2 | 15.0 | 1.0 |
| Commercially modified starch | | 19.4 | 10.0 | 2.0 |

[1] Determined by the method described by W. W. Roehr, Tappi 34, No. 11: 525 (November 1951).

The letterpress pick resistance was determined by unpublished test methods commonly employed in connection with the testing of papers having commonly modified binders; in the letterpress pick test, the lower numerical value indicates a superior situation. Briefly also, it may be noted that in the rotary rupture test and in the pick resistance test higher values indicated more appropriate coated paper. Thus the compositions formulated on a continuous basis and from unmodified, uncooked starch exhibited superior properties to the product attained in the same procedure but with a premodified starch.

EXAMPLE 2

Figure 5:
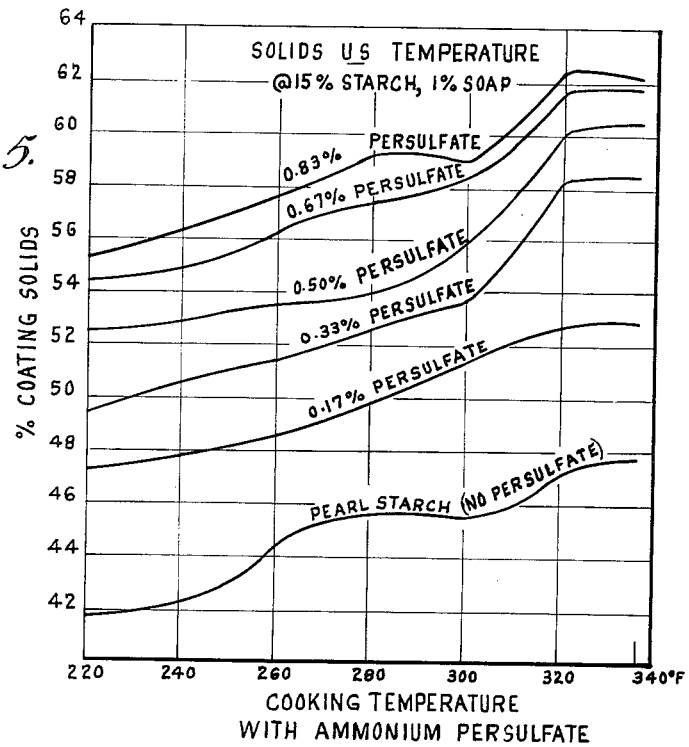
FIG. 5 is a graph illustrating the relationship of cooking temperature and coating solids for a preferred embodiment of the invention as set out in connection with FIG. 4.

Similar tests using the same base compositions were carried out to determine the effect of cooking temperature and oxidizing reagent level on coating solids, the percentage of coating solids being determined by the Brookfield viscometer at 50° C.; FIG. 5 illustrates these relationships. This data shows that the percentage of solids at constant viscosity and temperature of coatings, containing 15 parts of dry starch per 100 parts of clay, may be varied from 42 to 64%. This is achieved by varying the reagent between 0 and 0.83 parts, the reagent being ammonium persulfate based upon 100 parts of dry starch. The water content of the initial slurry in each instance was, of course, modified to provide the noted solids. As indicated in the graph, the cooking temperatures utilized ranged from 220–335° F. The values represented in the chart were reproducible. The formulation utilized included soap and, accordingly, the procedure involved generally the modification and cooking of pearl cornstarch simultaneously and continuously in the presence of a clay slip and soap.

Figure 6:
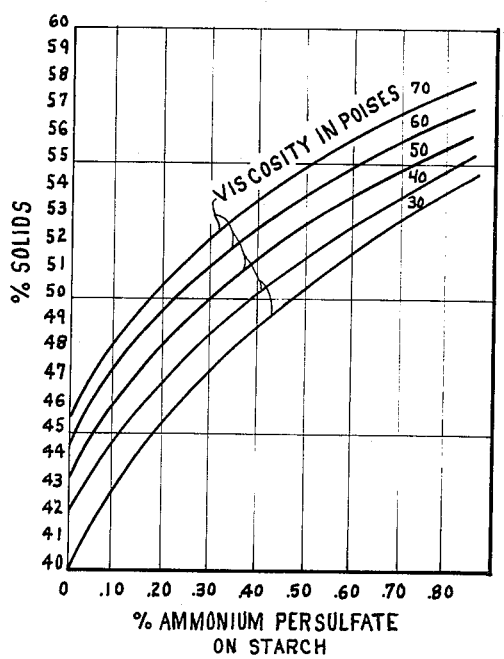
FIG. 6 is a graph illustrating the relationships of viscosity and percentage of solids in the coating composition at a constant percentage of starch and with the varying percentage of oxidizing agent based on the starch.

In connection with the foregoing it is to be noted that, while some modification of the starch is achieved with temperature alone, the quality of the coating when even a very small amount of oxidizing agent, i.e., ammonium persulfate, is employed to affect starch modification is much better than when no oxidizing agent is utilized. Coatings which were prepared without the oxidizing agent and simply modified to some degree by the high temperature were clearly distinguishable by the relatively poor appearance on the coating device. In contrast, coatings made with even the small percentage of persulfate set forth exhibited on the coating rolls characteristics at least equal to the best of the compositions prepared with commercially modified starches. The effect on percent solids of varying the percentage of oxidizing agent at a constant temperature of 240° F., with the same base composition set forth in Example 1, is shown in FIG. 6.

EXAMPLE 3

Figure 7:
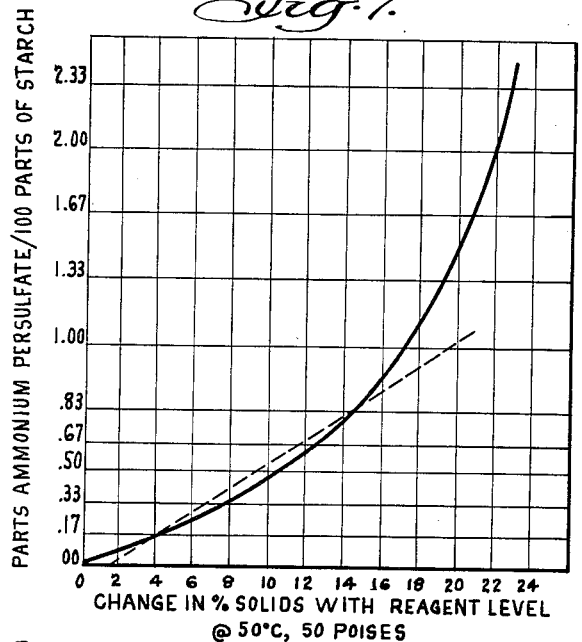
FIG. 7 is a graph illustrating the change in percent solids achieved by increasing reagent concentration in connection with the embodiment to which reference is made in FIGS. 4 and 5.
Figure 8:
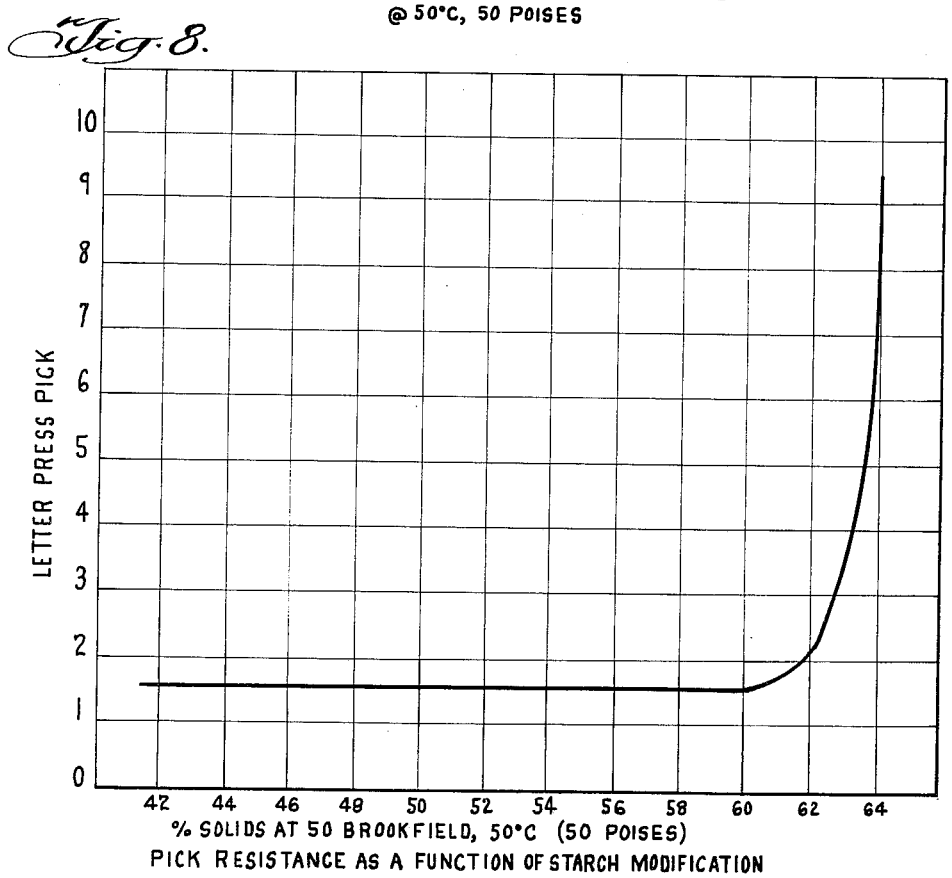
FIG. 8 is a chart illustrating the relationship between the pick resistance of a coating and the percentage of solids in the coating composition under conditions similar to those illustrated in connection with FIGS. 3–6 inclusive.

Tests were then conducted utilizing the same basic composition and reacting at a temperature of 260° F. with 15% of the raw starch and a 1% soap concentration in order to determine the change in percent solids which such a composition supports if the reagent level (ammonium persulfate specifically) is increased. The graph of FIG. 7 illustrates the relationship, the dashed line of the graph designating ranges which are particularly suitable for roll coating compositions. Reference to FIG. 5, for example, at a temperature of 260° F. and a reagent level of 0.67% based on the starch shows that the solids content is slightly above 57% while graph 7 shows that this represents a change over that achieved without any oxidizing reagent of over 12%. Since viscosity reduction may be achieved to some degree with temperature alone, it is pertinent to note that such reduction is relatively low (graph 5). However, with the controlled oxidizing reagent usage, very usable coating composition viscosity reductions at suitable solids are obtained.

EXAMPLE 4

Further tests were conducted using the same basic composition to which references were made, and the coatings were roll coated onto a 50-pound basis weight web (500 sheets 25 x 38 inches). Letterpress pick tests were made at each solids concentration as illustrated in graph 7. These compositions all contained 15% of starch binder and the reagent was, of course, varied to secure the same 50 poise viscosity at 50° C. The coatings in each instance were applied to the web at about 80° F. As may be noted from the foregoing, the graph illustrating the pick resistance relative to solids concentration was linear over a wide range and had low pick value indicating excellent paper properties for letterpress printing.

Above 62% solids the letterpress pick for the basic composition stated was sharply reduced. By decreasing the soap percentage in the composition to about ¼%, for example, and by increasing the ammonium persulfate reagent and the alkali, the letterpress pick resistance may be secured at a desirable value and at higher solids.

EXAMPLE 5

The hydrogen peroxide employed in the invention serves to provide somewhat improved color in the coating composition. The hydrogen peroxide, however, may be eliminated if desired. An exemplary coating composition with the hydrogen peroxide eliminated is as follows:

| | Parts by weight |
|---|---|
| Clay | 2000 |
| Dry pearl starch (Clinton 3011) | 300 |
| Sodium hexametaphosphate (Calgon) (50% aqueous solution) | 12 |
| Sodium hydroxide (50% aqueous solution) | 8 |
| Soap | 20 |
| Ammonium persulfate | 1 |
| Sodium carbonate | 1 |
| Water | 1100 |

Such composition was cooked in the device illustrated in FIG. 2 at a temperature of 230° F.; the composition emanated at 230° F., was then cooled and diluted to produce a viscosity of 50 poises at 50° C. and to exhibit a solids content of 54.8. This value of viscosity is attained when using a Brookfield viscometer with a No. 6 spindle at 100 r.p.m. Under this condition the Brookfield value is equivalent to poises, and throughout the specification poises and the Brookfield value are numerically the same.

The slurry entering the reaction chamber exhibited a pH of 9.6, while the coating composition after dilution had a pH of about 8.3. The solids drop due to dilution through the cooker is approximately five percentile.

Other oxidizing agents than the ammonium persulfate may be employed, and a number of the following specific examples illustrate this feature. Preferably, in the selection of the oxidizing agent, the agent should have a high oxidizing potential and the reaction products desirably should affect the coating solids in the finished formulation as little as possible.

EXAMPLE 6

A composition was formulated as follows:

| | Parts by weight |
|---|---|
| Clay | 2000 |
| Pearl starch | 300 |
| Soap | 20 |
| Sodium hypochlorite (5% solution) | 200 |

This composition slurried in water was reacted in the apparatus of FIG. 2 at a temperature of 260° F. After dilution the solids obtained was 53.3% at 50 poises at 50° C. This solids value represented an increase of about 4.2 percentage points over that of a similar composition but using no oxidizing agent.

EXAMPLE 7

Potassium permanganate was employed as the oxidizing agent in the following composition:

| | Parts by weight |
|---|---|
| Clay | 2000 |
| Pearl cornstarch (dry) | 300 |
| Soap | 20 |
| Tap water | 1500 |
| Potassium permanganate | 20 |

This composition also is cooked at 260° F.; the solids found was 54% at 10° Brookfield, 50° C., the effect of condensate dilution having reduced the solids concentration about six points. The percentage of potassium permanganate in this instance, based on the cornstarch, was relatively large; higher viscosities more suitable for roll coating may be achieved by simply reducing the quantity of potassium permanganate employed. The particular viscosity attained in this example, while useful, would be more generally employed in connection with coating apparatus using lower viscosities such, for example, as an air knife coater.

It is to be noted that here also, as with the hypochlorite, no neutralizing alkali is required.

EXAMPLE 8

Less soluble materials than ammonium persulfate are useful as an oxidizing agent, for example, potassium persulfate. However, more of the oxidizing agent by weight is then required to reduce a specific starch to a given viscosity in the presence of the components of the coating composition; also, more water is required for solution of the oxidizing agent itself. Exemplary of such a composition is the following formulation:

| | Parts by weight |
|---|---|
| Clay | 2000 |
| Pearl cornstarch (dry) | 300 |
| Soap | 20 |
| Potassium persulfate (0.67% on starch) | 2.37 |
| Hydrogen peroxide (3% aqueous solution) | 1.0 |
| Tap water sufficient to make | 1300 |

This composition, when cooked at a temperature of 260° F. in the cooker of FIG. 2, yielded a solids percentage of 57.9 and a viscosity of 50° C. of 50 poises.

In connection with the various oxidizing agents and particularly the potassium persulfate, it is to be noted that the quantity is usually greater for other oxidizing agent than for the ammonium persulfate. Illustrative of this factor is the relationship between the mole and weight quantity of potassium persulfate vs. ammonium persulfate to produce modification of a specific starch. The quantity required is set forth in the chart below on the basis of the anhydroglucose unit which is the basic repeating unit of the starch molecule. The comparison is of coatings prepared by cooking at 260° F. with 15% pearl cornstarch and 1% soap using potassium and ammonium persulfates:

| Potassium Persulfate | | | Ammonium Persulfate | | |
|---|---|---|---|---|---|
| Wt. percent on Starch | Moles per A.G.U.[1] | Percent[2] Solids | Wt. percent on Starch | Moles per A.G.U.[1] | Percent[2] Solids |
| 0.39 | 0.0237 | 51.8 | 0.33 | 0.0237 | 52.2 |
| 0.58 | 0.0355 | 54.9 | 0.50 | 0.0355 | 54.4 |
| 0.79 | 0.0474 | 57.9 | 0.67 | 0.0474 | 57.3 |

[1] A.G.U.=anhydroglucose unit: the repeating unit in the starch chain.
[2] At 50 poises, 50° C. (Brookfield Viscometer, #6 spindle, 100 r.p.m.).

It is to be noted that the modification of the starch per molecular weight of the oxidizing agent is essentially the same for either reagent, the potassium persulfate requiring a greater weight in grams to achieve the same degree of viscosity modification. It is to be noted that at 0.17% persulfate based on the starch, the moles per A.G.U. are 0.0118 and at 0.83% persulfate the value is 0.0592 mole. Also, at 0.1% the moles per A.G.U. then are 0.007 and at 1% of the persulfate the moles per A.G.U. are 0.070.

EXAMPLE 9

The starch content of the composition relative to the pigment may be materially increased in accordance with the process of the invention. Such compositions are frequently desired for particular types of printing paper. One example is paper used for offset printing. Due to the increased starch content, the solids of the total composition are then customarily lower. An exemplary composition which may be utilized in the practice of this invention is:

| | Parts by weight |
|---|---|
| Clay | 1000 |
| Pearl cornstarch (dry) | 300 |
| Soap | 20 |
| Sodium hexametaphosphate (50% aqueous solution) | 12 |
| Sodium hydroxide (50% aqueous solution) | 9 |
| Ammonium persulfate | 0.5 |
| Hydrogen peroxide (3% aqueous solution) | 2 |
| Tap water | 2200 |

The percentage of ammonium persulfate based on the starch in the above formulation is 0.167. This formulation, when reacted at a temperature of 240° F., exhibited a viscosity of 50 poises at 50° C. and had a solids content of 37%. A similar composition but with a decreased amount of tap water and an increased persulfate content, that is, 2 grams, and double the amount of the peroxide, when cooked at a temperature of 240° F., had a solids content of 41.6% at the noted constant viscosity of 50 poises and 50° C.

EXAMPLE 10

The stabilization of the viscosity of the coating composition as the composition issues from the reaction chamber is materially assisted by the presence of metallic ions in the coating compositon. Thus copper ions tend to aid viscosity stabilization. Exemplary of a composition for this purpose is:

| | Parts by weight |
|---|---|
| Clay | 2550 |
| Calcium carbonate | 450 |
| Pearl cornstarch | 480 |
| Soap | 30 |
| Sodium hexametaphosphate (50% aqueous solution) | 6 |
| Sodium hydroxide (50% aqueous solution) (dependent upon solids concentration and persulfate concentration) | 9.5–12.8 |
| Ammonium persulfate (dependent upon solids concentration and viscosity desired) | 0 to 4.0 |
| Copper sulfate | 2.4 |
| Tap water | 1810–3600 |

The table below illustrates the effect of persulfate variation over the range indicated in the example and the solids percentage attained at a viscosity of 50 poises at 50° C. at the various ammonium persulfate percentages. The reaction temperature in each instance was 230° F. and the percent persulfate on the starch varied from zero to 0.83 per 100 parts of starch. The graphs of FIGS. 10 and 11 (cooking temperature 230° F.) illustrate the effect of simply increasing the starch percentage (based on 100 parts of clay from 16% in FIG. 10 to 19% in FIG. 11).

| Percent ammonium persulfate based on starch: | Percent solids at 50 poises at 50° C. |
|---|---|
| 0 | 41.2 |
| 0.21 | 49.7 |
| 0.42 | 54.4 |
| 0.63 | 57.5 |
| 0.83 | 59.3 |

EXAMPLE 11

In the previously set forth examples the compositions were reacted in the chamber such as that set forth in FIG. 2 and wherein some dilution of the composition occurred due to condensation of the steam. Also, in such systems the composition in its reacted form emanating from the mixing and reaction chamber was passed to the atmosphere and then to the paper machine. Thus there was some flashing of steam upon exit from the chamber. This flashing, however, was not sufficient to affect the solids and was a constant factor for a given unit operating condition. The overall dilution, depending upon the specific nature of the unit, was between about 4–6 percentage points. This applied to the small laboratory units as well as units having a capacity of 7–11 gallons per minute of the coating color.

However, it is not necessary to flash to the atmosphere nor to utilize a system which involves dilution. A formulation suitable for use in the scraper type cooker, to which reference has already been made, is as follows:

| | Parts by weight |
|---|---|
| Clay | 2550 |
| Calcium carbonate | 450 |
| Pearl cornstarch | 480 |
| Soap | 30 |
| Sodium hexametaphosphate (50% aqueous solution) | 6 |
| Sodium hydroxide (50% aqueous solution) | 12.8 |
| Ammonium persulfate | 4.8 |
| Copper sulfate | 2.4 |
| Water | 1810 |

The above slurry was pumped through an inlet designated at 38 in FIG. 9 to the reaction vessel 39 and then to a cooling unit 40. The temperature of the composition issuing from the reaction chamber was 250° F. and the temperature issuing from the cooler 40 was 170° F. This material is then passed to a coating device illustrated schematically at 42 in FIG. 9. It is to be noted that both the units 39 and 40 were provided with internal rotating blades either scraping against or very closely arranged with relation to the interior heat exchange surface of the units. The cooling medium was water and the heating medium was steam and, in fact, one unit is substantially the reverse of the other in operation. This test was of significance as starch, when cooked, passes through a high viscosity peak as is well known, and the experiment demonstrated the ability of this type of heat exchanger to satisfactorily handle complete coating formulations throughout cooking range. The solids percent in this instance was the same as that of the original composition and, accordingly, with such a system no initial allowance need be made in the coating solids for dilution effects.

EXAMPLE 12

The prior examples have each included in the basic formulation a quantity of soap. While soap is particularly desirable in coating compositions for control of pattern and the like on the coating rolls or other device, it is not essential and the following formulation may be employed when it is desired either to eliminate soap or to add soap after the reaction:

| | Parts by weight |
|---|---|
| Clay | 2000 |
| Starch (dry basis) | 300 |
| Sodium hexametaphosphate (50% aqueous solution) | 2 |
| Tap water | 940 |
| Sodium hydroxide (50% aqueous solution) | 9.1 |
| Percent ammonium persulfate (based on starch) | 0.83 |

This formulation, when reacted at 260° F. in the apparatus illustrated in FIG. 2, exhibited a solids content of 56 and a viscosity of 50 poises at 50° C. Data for more dilute systems is set forth in the table below.

| Tap Water, g. | Sodium Hydroxide (50% Aqueous Solution), g. | Percent Ammonium Persulfate (Based on Starch) | Percent Solids at 50 Poises 50° C. |
|---|---|---|---|
| 1,000 | 8.3 | 0.67 | 54.4 |
| 1,100 | 7.9 | 0.50 | 53.5 |
| 1,200 | 7.4 | 0.33 | 53.0 |
| 2,000 | 6.4 | 0 | 48.8 |

It is to be noted from the foregoing table that the maximum solids attainable at the constant viscosity increased materially with the percentage of persulfate with respect to the procedure in which no ammonium persulfate was employed. It is also to be noted that the total solids without the soap is slightly less than that attainable with soap being employed. A comparison of the data in the table with the graph of FIG. 5 illustrates this feature. Accordingly, soap contributes somewhat to the attainment of higher total solids.

While reference has been made to soap, it is to be noted that surface tension reducing agents may usefully be employed and that for the soap indicated in the foregoing formulations other surfactant materials may be substituted such as sulfonated hydrocarbons, monoglycerides, ammonium stearate, calcium stearate, and the like.

EXAMPLE 13

In the coating compositions formulated as herein described the quantity of dialyzable material is commonly low and less than that formed in starches modified by conventional procedures and eliminated during processing. The following data illustrates this. An aqueous formulation containing 300 grams of starch on a dry basis was reacted with varying amounts of ammonium persulfate at a temperature of 300° F. At 0.33% of ammonium persulfate based on the starch, the material dialyzed against distilled water was found to be only 2.6% by weight of the starch. At 0.67% of ammonium persulfate the dialyzables were 2.2%. At 1% of ammonium persulfate the dialyzables were 4.1% by weight of the starch. Thus, it appears that by the practice of the present invention more of the original starch material is present for adhesive functions compared with commercial oxidation practice.

EXAMPLE 14

In the formulations described hereinbefore the clay (except for Example 13) has been incorporated in the initial slurry; the clay may be added in whole or in part to the reacted viscosity reduced starch emanating from the mixing chamber. Introducing the clay or other pigment initially is much preferred, however, both from an economic point of view as well as from the point of view of control of the ultimate viscosity of the coating composition and clay dispersion. One specific advantage of incorporating the clay initially is that kneaders may be eliminated which are commonly employed in clay slurry preparation.

The initial formulation may contain:

| | Parts by weight |
|---|---|
| Starch (pearl corn) | 300 |
| Water | 1500 |
| Ammonium persulfate | 1 |
| Hydrogen peroxide (3% solution) | 1 |

Such a formulation, when reacted in the apparatus of FIG. 2 at a temperature of 300° F., is flashed to the atmosphere and exhibits a viscosity at 52° C. (126° F.) of about 63 centipoises.

Clay to the extent of 2000 parts by weight may then be mixed in with the reacted starch with vigorous agitation to provide a coating formulation of 55% solids at a viscosity of 50 poises at 50° C. (122° F.). This clay is added in dry form. Such slurry has the following additional components added to achieve the above noted coating color solids and viscosity:

| | Parts by weight |
|---|---|
| Soap | 20 |
| Sodium hydroxide | 3.5 |
| Sodium hexametaphosphate (50% aqueous solution) | 2 |

While the starches useful in coating compositions such as those set forth hereinbefore may vary slightly due to their origin or initial isolating treatments, the foregoing procedure is applicable in general to starches commonly employed for coatings. The combination of temperature and amount of oxidizing reagent used has a controlling effect on the viscosity of the starch product. When the clay is incorporated with the starch and then subjected to the reaction temperature, the dispersion appears to have superior properties for coating applications.

The reaction temperature itself may be carried out over a wide range but below about 220° F. is not readily controlled to the degree usually desired. The maximum temperature limit is apparently that at which the material may be readily handled and, for commercial operations, need not ordinarily exceed about 350° F. in order to attain a very short reaction time.

In the foregoing examples the pH has been maintained on the alkaline side for the purpose of inhibiting clay flocculation which may occur to some extent due to the formation of acids. The presence of the alkali is also desirable to inhibit undesired acid modification of the starch itself, since the acid modification of starch is not as readily controllable as to viscosity and, therefore, is undesirable in any material extent in a continuous process.

From the foregoing examples, the control achieved by the practice of the invention is clear. Summarizing, if, in production operation at a given viscosity and a fixed starch percentage, it becomes desirable to increase solids, it is simply necessary to:

(a) Controllably reduce the initial slurry water content;

(b) Controllably increase the percentage of oxidizing agent; and (c) Provide that sufficient alkali is present to neutralize acidic products due to the increased oxidizing agent content—if the oxidizing agent employed contributes to an increased acid condition—and with such alkali to maintain the pH at least about 7.

Conversely, if it is desired to reduce solids at a given viscosity and at a fixed starch percentage (based on the pigment), it is simply necessary to:

(a) Controllably increase the initial slurry water;

(b) Controllably decrease the percentage of oxidizing agent; and (c) Provide sufficient alkali to neutralize the acidic products and maintain pH of the coating composition below about 10.5.

Further, if, at a given solids and viscosity and fixed starch percentage (based on the pigment) it becomes desirable to only decrease viscosity of the coating composition, this is achieved by:

(a) Controllably increasing the percentage of oxidizing agent; and (b) Providing sufficient alkali to neutralize reaction products and maintain the composition alkaline.

Likewise, if, at a given solids and viscosity at a given fixed starch percentage (based on the pigment), it becomes desirable to only increase viscosity, this is achieved by simply reducing the percentage of oxidizing agent.

Such changes as indicated may be desirable when switching from a run of one paper to another, or even during a run. These changes are, of course, facilitated by the fact that the oxidation reaction time is markedly shorter than in conventional oxidation procedures, but is nevertheless sufficiently long, it has been found, to permit control.

While specific coating formulations have been set forth in connection with the data and detailed examples, it is to be understood that formulations of the general type commonly employed in coating formulations are subject to the practice of this invention.

As already noted, the pick resistance of coatings produced in accordance with the invention is excellent. This is attributed to the excellent dispersion and film forming properties of the composition and the gelatinized product.

It will be understood that this invention is susceptible to modification in order to adapt to different usages and conditions, and accordingly, it is desired to comprehend such modifications within the invention as may fall within the scope of the appended claims.

What is claimed is:

1. In the process of preparing starch for use in paper coating compositions, the steps of forming an aqueous slurry containing raw starch and a water-soluble oxidizing agent in which the oxidizing agent is present in solution, feeding the said aqueous slurry continuously through a heating and mixing zone, heating the slurry in said zone to a temperature well above the gelatinization range of the starch and in the range of between about 220° F. and 350° F. while subjecting the slurry to a mixing action to effect thorough dispersion of the oxidizing agent in the slurry, and maintaining the feeding slurry so heated in the said zone for a time period to cook the starch and to substantially consume the oxidizing agent by reaction with the starch, and passing the feeding hot, cooked, oxidized starch from the heating zone to a receiving zone.

2. The process as claimed in claim 1 in which the period of time in which the slurry is heated in the heating zone is less than 2 minutes.

3. In the process of preparing starch for use in paper coating compositions, the steps of forming an aqueous slurry containing raw starch and a water-soluble persulfate as oxidizing agent and in which slurry the water-soluble persulfate is present in solution to the extent of between about 0.007 to 0.070 mole per anhydroglucose unit of the starch, feeding the said aqueous slurry continuously through a heating and mixing zone, heating the said slurry in said zone to a temperature well above the gelatinization range of the starch and in the temperature range of between about 220° F. and 350° F. while subjecting the slurry to a mixing action to effect thorough dispersion of the dissolved oxidizing agent, maintaining the feeding slurry so heated in the said zone for a time period to cook the starch and substantially consume the persulfate by reaction with the starch, prior to feeding the slurry to the heating zone introducing into the slurry a quantity of a water-soluble alkali to maintain the slurry at a pH of at least 7 throughout the feeding and heating step, and passing the hot, cooked, oxidized starch at a pH of at least 7.0 from the heating zone to the receiving zone.

4. The process as claimed in claim 3 in which the period of time in which the slurry is heated in the heating zone is less than 2 minutes, the mole ratio per anhydroglucose unit of starch to the oxidizing agent is between about 0.0118 and 0.0592 and the oxidizing agent is ammonium persulfate.

5. In a process of producing a pigmented paper coating composition, the steps of:
   (a) forming an aqueous alkaline slurry containing raw starch, pigment and a water-soluble oxidizing agent in which slurry the solids content is between about 50 and 70% by weight, the oxidizing agent is present in solution to the extent of between about 0.007 mole to 0.070 mole per anhydroglucose unit of the starch, and the starch and the pigment constitute essentially the solids content of the slurry, the pigment being present to at least the same extent by weight as the starch;
   (b) feeding said aqueous slurry continuously through a heating and mixing zone;
   (c) heating the slurry in said zone to a temperature well above the gelatinization range of the starch and in the range of between about 220° F. and 350° F. while subjecting the slurry to a mixing action to effect dispersion of the oxidizing agent and pigment throughout the starch-containing slurry;
   (d) maintaining the feeding slurry so heated in the said zone for a time period to cook the starch and to substantially completely consume the oxidizing agent by reaction with the starch; and
   (e) passing the hot, cooked, oxidized pigmented starch composition to a receiving zone.

6. The continuous, coordinated and controlled production of a coating composition for paper webs in which starch serves as an adhesive for binding pigment particles together and for bonding the pigment to a paper web, the process comprising the steps of forming an aqueous dispersion having a solids content of from about 50% by weight up to about 70% and including starch, pigment, alkali to maintain the dispersion pH between about 7.0 and 10.5, a dispersing agent and ammonium persulfate, said starch being present to the extent of between about 15 and 50% based on the weight of the pigment and said ammonium persulfate being present to the extent of between about 0.17% and 0.83% by weight based on the starch, said pigment forming essentially the balance of solids content of the slurry, so mixing and proportioning the components in slurry form as to render them useful for a paper coating composition formulation, feeding the said slurry through a heating zone to heat the slurry in said zone to a temperature of between about 220° F. and 350° F., vigorously agitating the slurry in a shearing action in said heating zone, retaining the slurry in said heating zone for a time which is markedly shorter than that used for conventional starch modification procedures but continuously urging said slurry while effecting the heating and agitation to an outlet of said zone, said heating and agitation serving to thoroughly mix the pigment and other constituents thoroughly into the swelling starch to provide the coating composition, maintaining the composition heated until said ammonium persulfate is completely consumed, and composition viscosity stabilized, and thereafter continuously flowing said coating composition to a receiving zone.

7. In the production of a coating composition of novel properties from an aqueous alkaline slurry having clay as pigment, starch as an adhesive to the extent of 15 to 50% by weight based on the pigment, ammonium persulfate as an oxidizing agent for the starch present to the extent of between about 0.17% and 0.83% based on the weight of the starch to effect limited oxidation of the starch, a dispersant for the clay and a small proportion of soap, said slurry having a solids content between about 50 and 70% by weight, and said clay forming by weight essentially the balance of said solids content the steps of flowing said slurry into a heating zone, directing said slurry to an outlet of said zone in a constricted stream, heating the slurry in said zone under pressure to a temperature of between about 220° F. and 350° F., maintaining the slurry heated until said oxidizing agent is completely consumed, vigorously agitating the slurry in the heating zone as the starch cooks and swells in its passage through the zone to thoroughly disperse the other constituents in the swelling starch, coordinating the factors of temperature of the heating slurry with relation to the starch-oxidizing agent content of the slurry at inter-related values to effect controlled viscosity reduction and debodying of the slurry as the oxidation reaction proceeds and until the oxidizing action is completed and viscosity is stabilized, cooling the viscosity stabilized coating composition, after the composition has emanated from said zone, to a temperature range suitable for application to a paper web, and flowing the composition to a coating device receiving zone.

8. The process of producing a coating composition for paper and the like which comprises forming a slurry of clay, starch and water containing a small amount of a water-soluble oxidizing agent and in which slurry starch is present to the extent of between about 15 to 22% of the clay based on the clay weight and the oxidizing agent is present as ammonium persulfate to the extent of about 0.17 to 0.83% of the starch based on the starch weight, said slurry having a solids content of between about 50 and 70% by weight and the clay constituting essentially the balance by weight of the said solids content; exerting a vigorous shearing action upon said slurry while passing said slurry through a heating zone, heating said slurry in said zone to a temperature between about 220–350° F. to cook the starch and react the oxidizing agent with the starch, maintaining the temperature within said range for a time sufficient to permit starch gelatinization and substantially complete consumption of the ammonium persulfate by reaction with the starch, flowing the cooked slurry to a receiving zone, and cooling the slurry to a temperature suitable for application to paper as a coating material as the cooked slurry flows from the heating zone to the receiving zone.

References Cited by the Examiner

UNITED STATES PATENTS

| 2,394,233 | 2/46 | Craig | 106–214 |
| 2,783,167 | 2/57 | Lineberry et al. | 260—233.3 |

FOREIGN PATENTS 595,240    12/47    Great Britain.

OTHER REFERENCES

Pages 341 and 501, (1950), Chemistry and Industry of Starch, 2nd edition, Kerr.

M. LIEBMAN, *Primary Examiner.*

JOSEPH REBOLD, *Examiner.*